United States Patent [19]
Krabs et al.

[11] Patent Number: 6,103,975
[45] Date of Patent: Aug. 15, 2000

[54] PRE-ASSEMBLED ELECTRICAL SPLICE COMPONENT

[75] Inventors: Raymond Krabs; Winfried H. Knorr, both of Hamburg; Manfred G. G. Viebranz, Appel, all of Germany

[73] Assignee: 3M Innovative Properties Company, Saint Paul, Minn.

[21] Appl. No.: 09/106,224

[22] Filed: Jun. 29, 1998

[51] Int. Cl.$^7$ .................................................. H02G 15/64
[52] U.S. Cl. .......................................................... 174/74 A
[58] Field of Search ............................... 174/74 R, 74 A, 174/73.1, DIG. 8

[56] References Cited

U.S. PATENT DOCUMENTS

| | | | |
|---|---|---|---|
| 3,515,798 | 6/1970 | Sievert | 174/135 |
| 4,742,184 | 5/1988 | Courty et al. | 174/73.1 |
| 5,028,742 | 7/1991 | Redman et al. | 174/88 |
| 5,589,667 | 12/1996 | Tsukazaki et al. | 174/135 |
| 5,821,459 | 10/1998 | Cheene-Astrorino et al. | 174/73.1 |

FOREIGN PATENT DOCUMENTS

| | | | |
|---|---|---|---|
| 101472 B1 | 2/1984 | European Pat. Off. | F16B 4/00 |
| 393495 B1 | 10/1990 | European Pat. Off. | H02G 15/18 |
| 424090 B1 | 4/1991 | European Pat. Off. | H02G 15/18 |
| 435569 A1 | 7/1991 | European Pat. Off. | H02G 15/18 |
| 702444 A1 | 3/1996 | European Pat. Off. | H02G 15/18 |
| 780949 A1 | 6/1997 | European Pat. Off. | H02G 15/184 |
| 30 01 158 | 7/1980 | Germany | H02G 15/18 |
| 3027097 A1 | 2/1982 | Germany | H02G 15/18 |
| 3715915 A1 | 12/1988 | Germany | B29C 63/10 |
| WO 94/29938 | 12/1994 | WIPO | H02G 1/14 |
| WO 95/31845 | 11/1995 | WIPO | H02G 15/184 |

OTHER PUBLICATIONS

Instruction manual entitled "Montageanleitung" for the cold shrink splice No. 24CSJ, By Euromold N. V./Alcatel, Industriezone 3, B–9320 Erembodegem–Aalst, Sep. 1997.

Peter Gaedicke and Raymond Krabs, Prefebricated Cold–Shrink Splice System for MV Power Cables, Power Engineering Journal Dec. 1996.

*Primary Examiner*—Kristine Kincaid
*Assistant Examiner*—Chau N. Nguyen
*Attorney, Agent, or Firm*—Matthew B. McNutt

[57] ABSTRACT

A pre-assembled electrical splice component for splicing electrical cables of the type including a central conductor, an insulative layer, a conductive shield, and an outer protective jacket. The pre-assembled splice component includes a radially collapsible support core, upon which is positioned on a conductive sleeve. At least one spring is positioned over the conductive sleeve and compresses the sleeve against support core. When the support core is removed the spring constricts to a reduced diameter and thereby compress the conductive sleeve against a conductive shield of the cable. Additional layers of material may be placed on the support core for providing electrical insulation or shielding.

17 Claims, 9 Drawing Sheets

PRE-ASSEMBLED ELECTRICAL SPLICE COMPONENT

BACKGROUND OF THE INVENTION

The invention described herein relates to technology for splicing medium and high-voltage electrical cables. In particular, the invention is a pre-assembled electrical splice component for splicing medium and high-voltage electrical cables.

Medium and high-voltage electrical cables typically consist of a central copper or aluminum conductor surrounded by several concentric layers of various materials. Specifically, the central conductor is typically surrounded by an insulative layer, which in turn is surrounded by a conductive shield layer and an outer protective jacket. The material and the dimensions of the insulative layer are chosen so that the required insulation of the central conductor is achieved. The shield layer is a conductive layer which electrically is kept at ground level and which is typically designed so that it can withstand short circuit currents, in the event a short circuit should occur. The conductive shield is usually comprised of a layer of shield wires. The outer jacket provides the cable with protection against mechanical impacts, and prevents the ingress of humidity or water into the splice.

When building up a power distribution network, it is often necessary to splice the ends of medium or high-voltage cables together. The splicing is done in a way experienced over many decades. First, lengths of each of the different cable layers are removed adjacent the ends to be spliced, such that a portion of each layer is exposed. Next, the central conductors are connected through the use of known screw-type or crimped connectors. Finally, it is necessary to reconstruct the electrical configuration of the original cable over the area of the splice. That is, the splice must be provided with an insulation layer over the central conductor, a conductive shield and an outer protective layer.

Currently, the insulation layer, conductive shield and protective jacket are typically reconstructed by individually installing multiple layers of material onto the splice, or by using multi-layer components which incorporate more than one layer into a single sleeve for simultaneous installation over the splice. These sleeves are preferably formed from elastomeric materials which are mechanically expanded and placed onto a support core. The expanded sleeve can then be moved over one cable end prior to the splicing, and then easily moved back over the splice for installation. The support core is then removed after placing the sleeve over the completed splice, so that the sleeve elastomerically shrinks down onto the splice.

The support core may take any of several forms. For example, support cores can consist of tubes which are pulled out of pre-stretched components and which can then be split into parts for removal from the cable. Such an arrangement is shown, for example, in FIG. 2 of the German Offenlegungsschrift DE 30 01 158 (S.A. des Cableries). An alternative approach can be seen from the European Patent Application EP 0 702 444 (Fournier). Yet another type of support core is a spirally wound system which is gradually removed, thereby allowing the system to shrink down as described in U.S. Pat. No. 3,515,798 (3M) or the European Patent EP 0 101 472 (3M) or the German Offentegungsschrift DE 37 15 915 (3M) or the U.S. Pat. No. 5,589,667 (3M).

It is known to provide an elastomeric multi-layer sleeve which may, for example, reconstruct the insulation layer and the conductive shield layer. It is also known to include in the sleeve additional stress control components for smoothing areas of electrical stress which unavoidably occur at points of discontinuity in the conductive shield.

After installing the elastomeric multi-layer sleeve (comprising an insulation layer and a conductive layer) over the splice, the portion of the sleeve which provides a conductive shield must be electrically connected to the exposed conductive shield layers of the two cable ends. This is normally achieved by placing an additional conductive layer over the entire multi-layer sleeve. The additional conductive layer is typically formed from, for example, a metallic braid which extends over the entire multi-layer sleeve, as well as over the exposed portions of the conductive shield layers at both cable ends. Most preferably copper braids are used for this purpose. For a reliable connection, spring connectors such as constant force springs are applied onto the conductive braid at the points where the conductive braid overlaps and contacts the exposed portions of the cable shield layers. The constant force springs have the advantage of establishing a secure and permanent electrical contact between the conductive braid and the shield of the cable which is capable of withstanding the electrical currents which would result from a short circuit. The use of constant force springs is important, because experiments have shown that a sufficient electrical contact is not provided between the conductive braid and the cable shield by, for example, an elastomeric rubber sleeve placed over the braid, especially in case of short circuits.

Finally an outer protective jacket must be placed over the entire splice, and thereby serves as a cable jacket replacement. The outer jacket is typically installed by using a pre-stretched tube which is also placed over to one of the cable ends prior to the establishment of the splice. As a final act this protective outer layer is shrunk over the entire connection. The outer jacket is selected so that it provides adequate sealing forces to prevent moisture from entering the splice.

The multi-layer sleeve that is directly shrunk over the splice in itself already represents a progress over the conventional technology, as it permits several components to be combined into a single unit, such as the above-mentioned stress control components, an electrode providing a Faraday cage over the actual splice, the insulation layer and the conductive shield layer. Thus, the above described method already significantly reduces the number of components to be applied in order to establish a complete splice of medium or high-voltage cables.

There have been attempts to further simplify the manner in which medium and high-voltage cables are spliced. As a next step, configurations have been developed in which the conductive braid and the cable jacket replacement are also placed onto the multi-layer component to further reduce the number of components which must be individually applied when forming a splice. However, even when the conductive braid and protective jacket are incorporated onto a single support core for application to a splice, it is still necessary to establish a good and permanent contact between the braid and the shield layer of the cables by applying the constant force springs. This is an additional step which must be performed, and it would be desirable if it could be eliminated. However, removing the step is difficult, as constant force springs are needed for reliable contact, but their application is not easily accomplished, as will be described below.

The splicing method described above can be understood, for example, from the figures of German Offenlegungsschrift DE 30 27 097 (Siemens). FIG. 1 of the reference shows a cross-sectional view through a portion of a splice prior to shrinking down the components, and illustrates many of the parts required to complete the splice. The cable conductor 3 is surrounded by the cable insulation 4 which is coated with a shield 5, additional shield wires 6 and the cable jacket 7. The conductor is crimped with a connector 2 to the other cable end (not shown). A multi-layer sleeve 10 includes an inner electrode 12 serving as a Faraday cage, an insulation layer 11 and an outer conductive shield 15, 16 placed onto a support core 17 which consists of a spiral that can be removed so that the entire sleeve would shrink down onto the connection. Furthermore, an additional conductive shield 18 and a second support core 21 are shown onto which the outer cable jacket replacement 20 is placed.

FIG. 1 of DE 30 27 097, however, does not represent any means for good and permanent electrical contact between the shields 5, 6 of the cable and the shields 15, 16, 18 of the splice. Accordingly, constant force springs are not depicted.

Constant force springs, however, can be best understood from the U.S. Pat. No. 5,028,742 (3M) which particularly well depicts the use of a constant force spring. In FIG. 3 of the reference, a typically prepared cable end is shown with a conductor 14, insulation layer 16, a conductive shield 18, and a protective jacket 20. In this particular reference the actual cable connection is established by means other than that described above. However, it can be seen that a conductive braid is used in the form of a strip 26, 28 which is mounted onto the shield 18 of the cable through the use of the constant force spring 24. The complete connection can be best seen in FIG. 5 which primarily shows the proper use of the constant force springs 24, although the connection as such is different from the connection depicted in FIG. 1 of DE 30 27 097.

The multi-layer sleeve which is placed onto the splice connection can have a variety of forms. An example of a multi-layer sleeve is described in EP 0 435 569 (3M). On a support core 20 is placed a molded multi-layer body 10 having an inner electrode 18 to establish a Faraday cage over the crimp or screw-type connector, two stress control components 14, 16, an insulation layer 12 and an outer conductive shield 11. This component is placed onto the cable connection, and then is further covered with other components (such as a conductive braid, constant force springs, and a projective jacket) as described above.

Another multi-layer sleeve configuration is described in WO 95/31845 (3M) which differs from the preceding one by the absence of stress control components. This is possible as the insulating material itself provides the stress control.

A more compact system is described in EP 0 393 495 (Pirelli) and especially in FIGS. 7 and 9. The reference shows a support core 19 onto which a multi-layer sleeve 3' is placed. Also placed onto core 19 is a cable jacket replacement 21. Due to the longer length of cable jacket replacement 21, the jacket replacement 21 is folded back upon itself at both ends. Between the multi-layer sleeve 3' and the cable jacket replacement 21 a conductive layer, typically a braid 16, is placed.

The installation method for a splice assembly similar to that shown in EP 0 393 495 is, for example, described in the instruction manual from Alcatel/Euromold for the cold shrink splice 24CSJ. Although the instruction manual is in German, the assembly method can be clearly understood from the figures. Pages 1–3 of the instructions show the preparation of the cable ends. Especially on page 2 it can be seen in which way the shield wires (Schirmdrahte) are exposed and folded back over the outer cable jacket. On page 5 it is depicted in which way the complete splice body (Muffengehäuse) is moved over one cable end (to the right) and an additional body for portions of the cable jacket replacement is moved over the other end (to the left). The connection of the central conductors is established as depicted on page 6 and in this case the Faraday cage is established by a different method as depicted on page 7. The splice body is moved over the connection as shown on page 8 and the support core (which in this case consists of two tubes) is removed so that the entire system shrinks down as depicted in pages 9 and 10. Page 11 shows the decisive feature insofar as it can be seen that the braid has to be removed by folding it back, and the constant force spring (Rollfeder) is partially applied onto the conductive shield wires of the cable ends. To do this, the constant force spring which is supplied as a separate component is opened at the outer end and essentially a single turn is applied onto the cable by partially unwinding the constant force spring. Then, as depicted in the lower figure of page 11, the copper braid is folded back onto this single layer of the constant force spring as well as onto the cable. Then, the constant force spring as such is further unrolled over the braid so that at the end the braid is pressed onto the cable for secure electrical contact. It must be understood that to achieve this result portions of the braid have to be opened so that the upper layers of the constant force springs can be placed on top of the copper braid. Therefore, at the end of the process, the following configuration is obtained: The cable with the folded back cable shield wires onto which approximately a single layer of the constant force spring is applied, this single layer being covered by the copper braid which has to be opened on the point of the transition, the entire configuration then followed by the additional layers of the constant force spring which are applied onto the copper braid. As a final step, as depicted on page 12, the cable jacket replacement portions are applied onto the two ends of the spice, thereby covering the previously exposed portions of the braid.

As can be seen from the above description, application of the constant force spring is typically rather difficult and cumbersome, even when the conductive braid is applied as a part of the multi-layer sleeve. Therefor, it is desired to be able to apply all of the components, including the constant force springs, in a single action.

SUMMARY OF THE INVENTION

The present invention is a pre-assembled splice for medium and high-voltage cables which incorporates all of the splice components, including the constant force springs, onto a single support core. In this manner, only one part has to be moved over one cable end which, after having established the connection between the central conductors of the cable, is then moved over the connection and shrunk down in a single step. The invention thereby practically establishes the entire splice configuration as described above, and ensures good electrical connection between the conductive braid and the cable shields. It furthermore is possible to include into the system layers of mastic which provides an additional protection against ingress of moisture at the ends of the configuration. Preferably, the support core is a radially collapsible system such as the above described spiraly wound cores. Radially collapsible cores are preferred because removable tubes as, for example, depicted in the Alcatel/Euromold product instructions, typically require high longitudinal forces for their removal and may get completely blocked by the constant force springs. The constant force springs themselves have to be chosen with respect to their dimensions and surfaces so that upon removal of the support core they are capable of shrinking down to provide a secure connection. In particular, the turns of the springs cannot block each other as the springs shrink onto the cable.

BRIEF DESCRIPTION OF THE DRAWINGS

The invention is described in detail below with reference to the following figures.

DETAILED DESCRIPTION OF THE INVENTION

Figure 1:
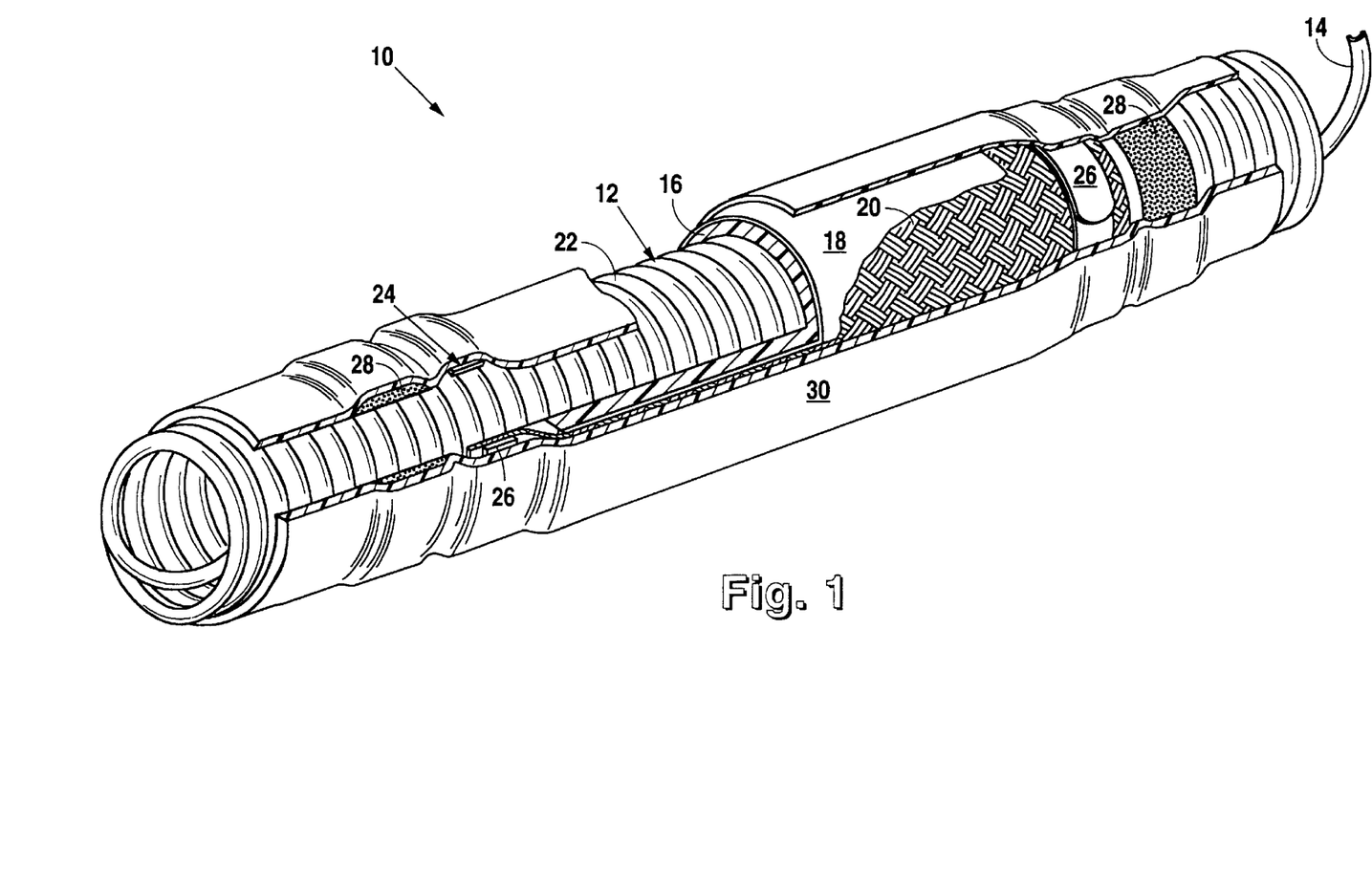
FIG. 1 is a perspective view, partially sectioned, of a first embodiment of the present invention.

Preferred embodiments of the invention are depicted in FIGS. 1–9. FIG. 1 shows a pre-assembled splice assembly 10 in which all essential components of the splice are placed onto a common support core 12. Portions of the various components have been removed from the Figure, such that the arrangement of the components can be clearly seen. Support core 12 preferably consists of a spirally wound radially collapsible coil, an end 14 of which is passed through the inner portion of the core 12 so that when pulling end 14 in a longitudinal direction the core 12 is step by step removed, thereby allowing the entire configuration to shrink onto the cable connection. Radially collapsible support cores are preferred because other types of cores require a high longitudinal force for removal, and would likely disrupt the position of the constant force springs described below, or would be blocked from removal by the radially compressive force of the constant force springs. Preferred configurations of the core 12 are described in U.S. Pat. No. 3,515,798 (3M), European Patent EP 0 101 472 (3M), German Offenteg-ungsschrift DE 37 15 915 (3M), and U.S. Pat. No. 5,589,667 (3M).

In the splice assembly 10 of FIG. 1, two extruded layers are used: an insulation layer 16 and a shielding layer 18. The layers 16, 18 can either be individually placed onto the support core 12, one after the other, or they may be manufactured in a co-extrusion process. Over the extruded layers 16, 18, a copper braid 20 is coaxially arranged. The braid 20 projects over each end of the extruded layers 16, 18, thereby making direct contact with the outer surface 22 of the support core 12 in areas 24 adjacent both ends of extruded layers 16, 18. Two constant force springs 26 are applied onto the copper braid 20 in areas 24. Springs 26 have a relatively small width in the longitudinal direction of the splice and may have a width in the range of 5–50 mm, preferably in the range of 10–20 mm. Springs 26, as well as the two extruded layers 16, 18 have been expanded prior to their application onto the support core 12. Thus, the internal diameter of extruded layers 16, 18, braid 20 and springs 26 prior to the expansion is smaller than the diameters of the cable and/or cable connection onto which the system has to be applied. These constant force springs 26 have been selected so that in the expanded stage the windings of the springs 26 do not block each other, but are designed so that upon the removal of the support core 12 the entire constant force spring 26 can reduce its diameter by an appropriate movement which will be described in more detail below.

Adjacent the ends of the copper braid 20 are two mastic layers 28. The mastic layers 28 are chosen so that they can provide the necessary sealing against water or humidity and which are also capable of shrinking down to a reduced diameter upon removal of core 12 (although they do not have to have any additional elasticity). A cable jacket replacement 30 is placed over all of the components. The cable jacket replacement 30 is an expanded elastomeric tube which is placed onto the support core 12 such that it covers all the other components.

Figure 2:
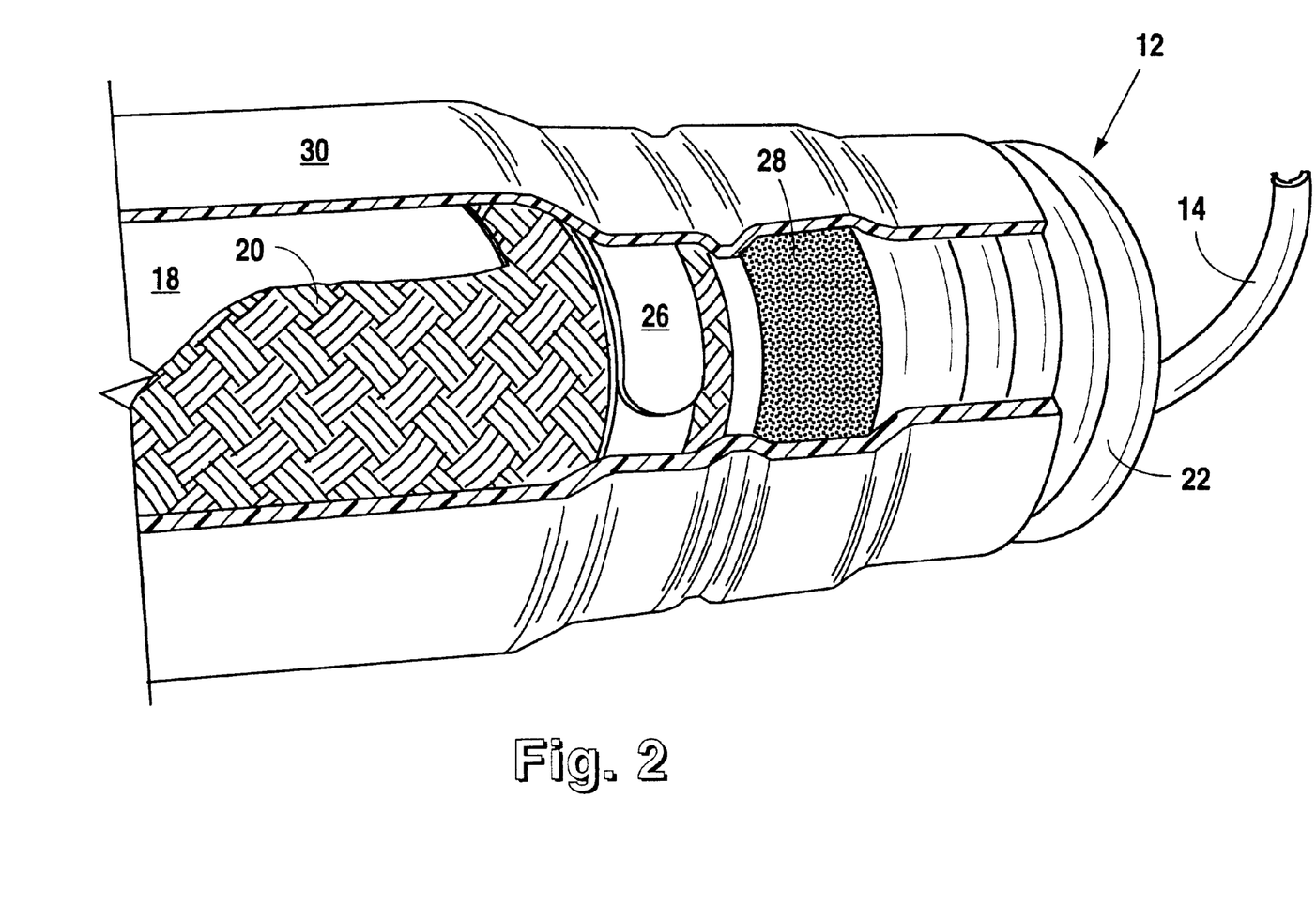
FIG. 2 is an enlarged portion of the perspective view of FIG. 1.

FIG. 2 provides an enlarged view of the right end of the cable splice assembly 10 as depicted in FIG. 1. It shows in more details the configuration of the copper braid 20 onto which the constant force spring 26 has been applied and the mastic layer 28 placed on the right side of the copper braid 20, all components being covered by the cable jacket replacement 30. Only the end of the support core 12 protrudes past cable jacket replacement 30, together with the end strip 14 which is used in order to pull out the spirally wound core 12.

Figure 3:
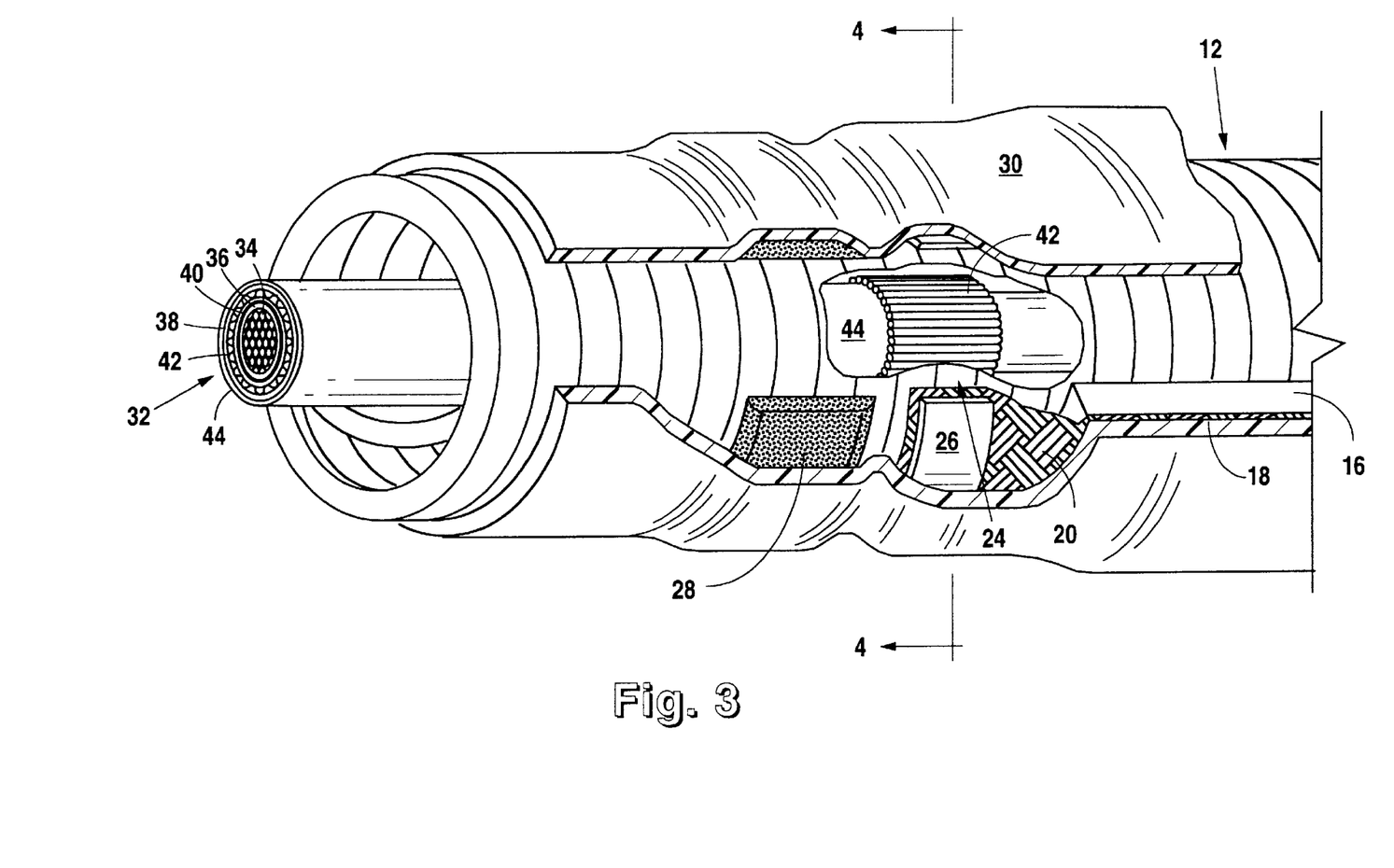
FIG. 3 is an enlarged portion of the perspective view of FIG. 1.

FIG. 3 shows in a similar manner the left portion of the cable splice assembly 10 as depicted in FIG. 1. However, for better understanding the cable splice assembly 10 is shown in a configuration in which the entire cable splice assembly 10 has already been moved over the cable connection (not shown) prior to the actual removal of core 12. On the left side of FIG. 3 a cross-sectional view of a cable 32 can be seen with the cable conductor 34 surrounded by the cable insulation 36 and the cable shield 38 which typically includes an outer conductive or semi-conductive layer 40 of the cable insulation 36 which is in direct contact with an arrangement of cable shield wires 42 which are chosen so that they can withstand short-circuit currents. The cable shield wires 42 are then surrounded by the cable jacket 44 that provides the necessary environmental and mechanical protection.

In FIG. 3, the support core 12 is broken away and the cable shield wires 42 close to the actual connection are shown. To prepare the cable 32 for splicing, as described above, it is necessary to remove the different layers from the cable conductors 34 and to fold the cable shield wires 42 back onto the cable jacket 44. Mastic 28, copper braid 20 and constant force springs 26 are shown in the same manner as in the previous figure.

Figure 4:
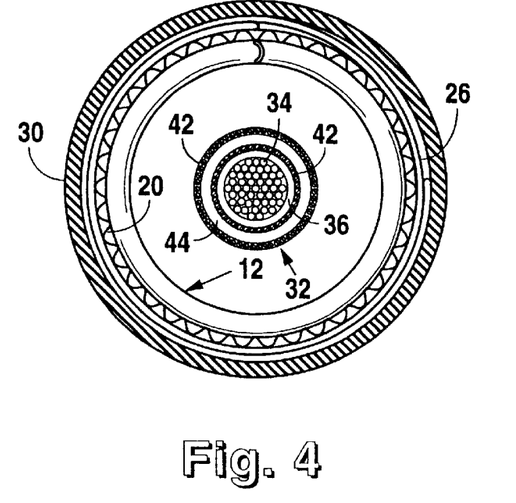
FIGS. 4–6 are cross-sectional views of the embodiment of FIGS. 1–3, taken along line 4—4 of FIG. 3, illustrating the manner in which the device shrinks into contact with a cable.
Figure 5:
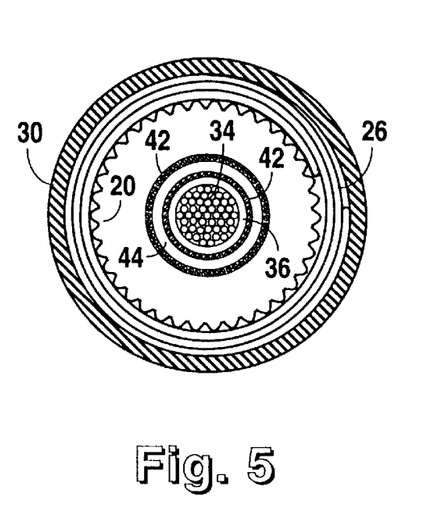
Figure 6:
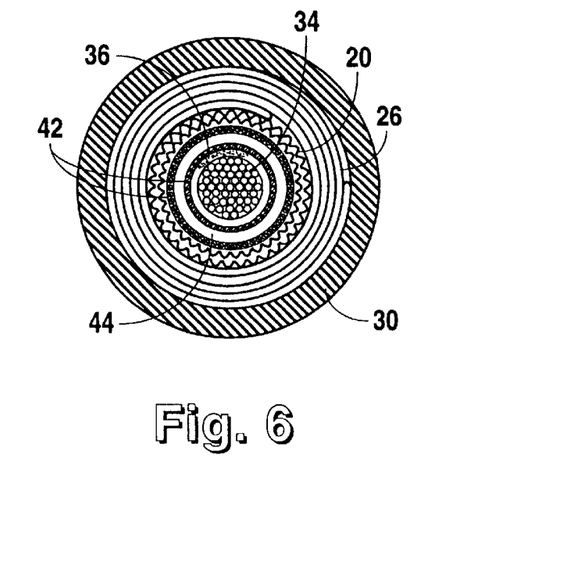

FIGS. 4–6 illustrate the operation of splice assembly 10 during its application to cable 32. FIGS. 4–6 are cross-sectional views through both the cable splice assembly 10 and the prepared cable 32, showing how the cross-section of the splice assembly 10 changes as it shrinks onto cable 32. FIG. 4 corresponds to FIG. 3 by being the cross-sectional view along the plane depicted as 4—4. As previously shown, the cable conductor 34 is surrounded by the insulation 36, the cable shield wires 42 and the cable jacket 44. It can be seen that cable shield wires 42 are folded back on the outside of the cable jacket 44. The cable splice 10 is also shown on the support core 12 onto which the copper braid 20 is placed, surrounded by the constant force spring 26 and the cable jacket replacement 30. In the expanded configuration of FIG. 4, the constant force spring 26 is shown to have about 1¾ turns.

FIGS. 5 and 6 demonstrate the manner in which the entire splice assembly 10 shrinks down onto cable 32. FIG. 5 shows the cable in the same cross-sectional view as FIG. 4, shortly after the support core 12 has been removed from the corresponding portion of splice assembly 10, while FIG. 6 shows the configuration after the completed shrinking process. In FIG. 5 it can be seen that the copper braid 20 is surrounded by the constant force spring 26, which in this configuration has three turns. The cable jacket replacement 30 has a somewhat enlarged thickness because the overall cross-section of the elastomeric tube essentially remains the same during the shrinking process.

The changing configuration is further illustrated in FIG. 6 where all the components have shrunk down so that the copper braid 20 is in direct contact with the folded back shield wires 42. The copper braid 20 is surrounded by five turns of the constant force spring 26 and the cable jacket replacement 30 has gained additional thickness. It should be taken into account that at the end the copper braid 20 and the folded back shield wires 42 become in intimate contact with each other through the force of the constant force spring 26.

FIGS. 4–6 show that the splice assembly 10 shrinks down in a rather unusual manner as the different components show different shrinking processes. The copper braid 20 consists of individual flat copper wires, the dimensions of which remain essentially the same, but which move closer together as the assembly 10 shrinks, such that in the final configuration of FIG. 6 the wires may overlap each other. The constant force spring 26 shrinks in a completely different and novel manner as it turns in on itself, such that the number of turns changes from approximately 1¾ turns to 5 turns as depicted in this configuration. Of course, it will be recognized by those skilled in the art that these numbers can change according to the specific design, but the shrinking process is always the same as the spring turns back into itself, similar to the turns of a spring in a mechanical wrist-watch. Accordingly, it is necessary as explained above to choose spring configurations which are capable of this shrinking process, to prevent the different layers of the spring from blocking each other as the springs 26 wind up. Furthermore, the cable jacket replacement 30 shows a third way of shrinking, mainly the well-known shrinking of elastomeric components, where the thickness of the article gradually increases as the overall cross-section of the elastomeric tube stays essentially the same.

Figure 7:
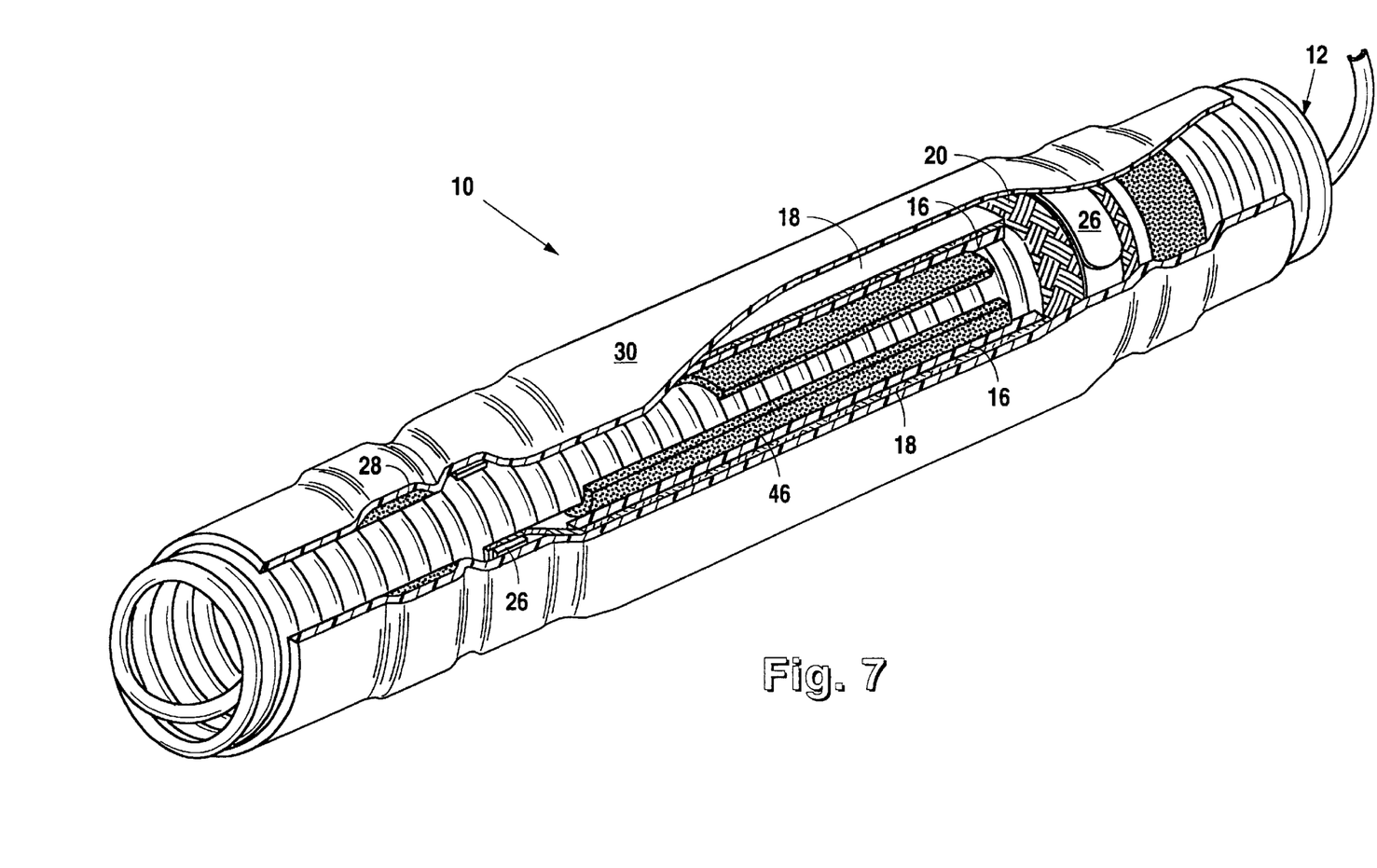
FIG. 7 is a perspective view of an alternative embodiment of the present invention.

FIG. 7 shows an alternate embodiment of a cable splice assembly according to the present invention. The configuration depicted in FIG. 1 requires appropriate preparation of the cable connection, which can be done by covering the connection with a stress controlling semi-conductive material. One possible alternative to this is to cover the entire cable connection with a stress controlling mastic material. A preferred embodiment is depicted in FIG. 7. The assembly 10 includes a layer of a preferably semi-conductive mastic 46 which has been arranged under the extruded sleeve layers 16, 18. This configuration should be understood as a further alternative which is useful for certain applications. An example of a suitable mastic material is described in detail in European Patent Application EP 0 780 949 (3M).

Figure 8:
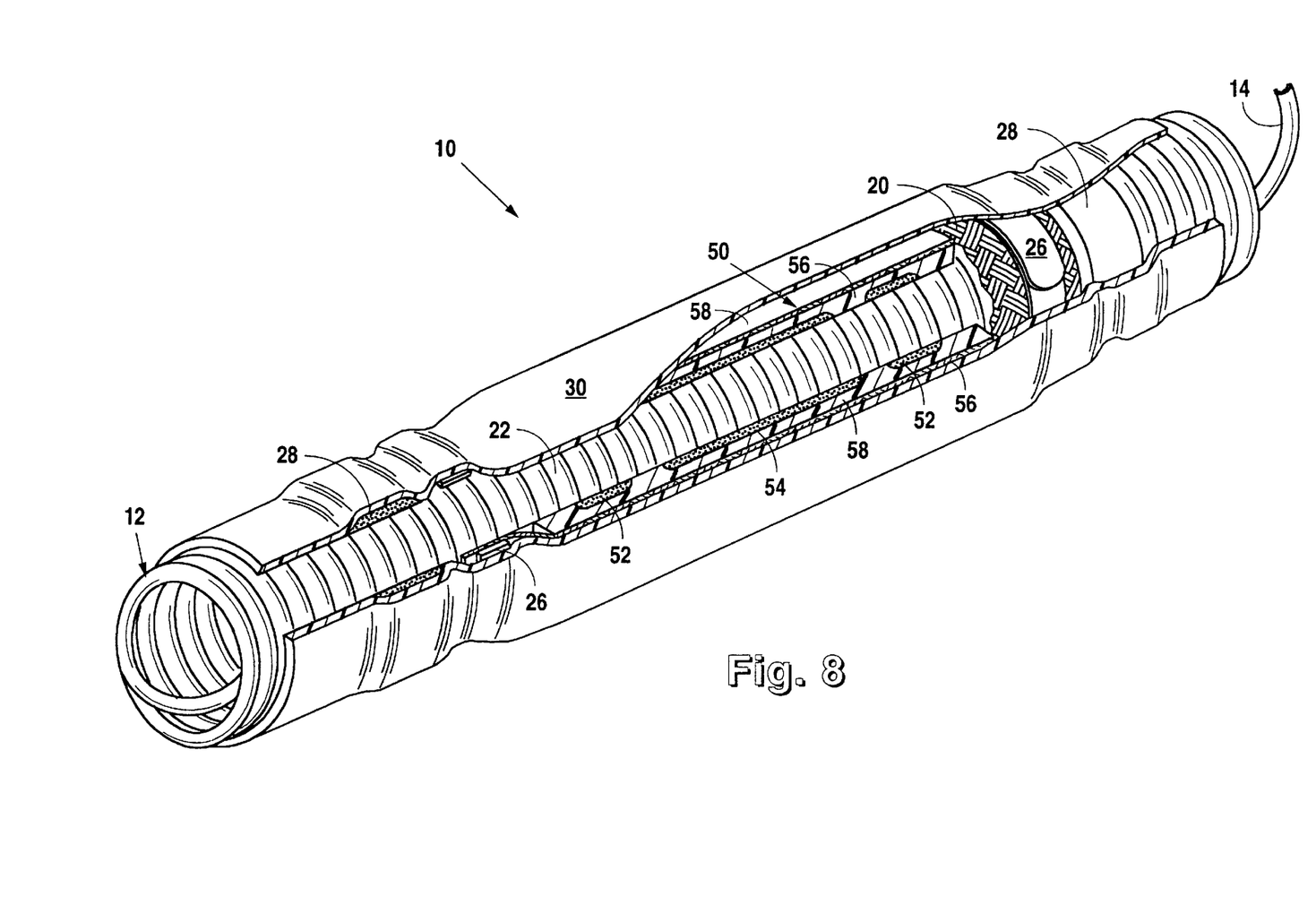
FIG. 8 is a perspective view of another alternative embodiment of the present invention.

FIG. 8 shows another alternate embodiment of a cable splice assembly according to the present invention. The difference essential from the embodiment of FIGS. 1–6 is that instead of having two extruded layers 16, 18, a molded sleeve 50 is used. Sleeve 50 is provided at the two inner ends with stress control components 52 and with an additional electrode 54 in the middle, all three components being covered with an insulation layer 56 and the whole arrangement being further covered with a shielding layer 58. For practical reasons the best method to obtain such a sleeve is to mold the different components one upon each other. This is described in more detail in the European Patent EP 0 435 569. All other components are identical to the ones in FIG. 1.

Figure 9:
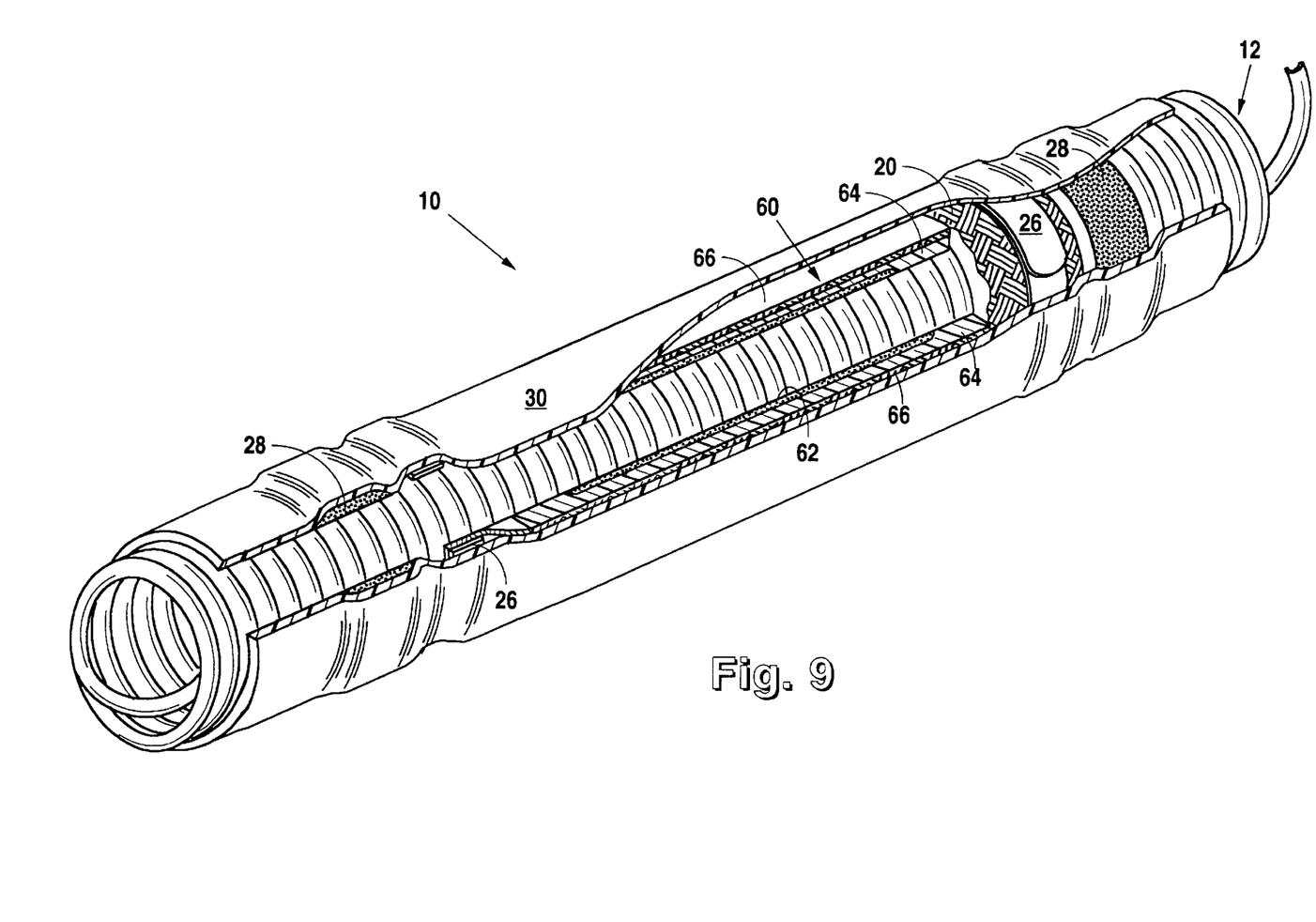
FIG. 9 is a perspective view of another alternative embodiment of the present invention.

FIG. 9 shows another alternate embodiment of a cable splice assembly, where a somewhat different molded sleeve 60 is used. Sleeve 60 consists of a middle electrode 62 only and an insulation layer 64 which itself is covered by a shielded layer 66. The insulation layer 64 preferably has specific properties which provide a stress control which is described in more detail in the International Application WO95/31845.

The alternate embodiments of FIGS. 1, 7 and 8 show that a whole variety of sleeves can be used successfully. Furthermore, it should be understood that the copper sleeve 20 may have different types of configurations. It essentially has to be in electrical contact with the shielded layer of the sleeve on one side and the shield of the cables 32 on the other side. The mastic layers 28 are an optional feature which provide additional sealing when needed. Mastics of this type are for example described in the European Patent EP 0 424 090 (3M) and the European Patent Application EP 0 780 949 (3M).

Figure 10:
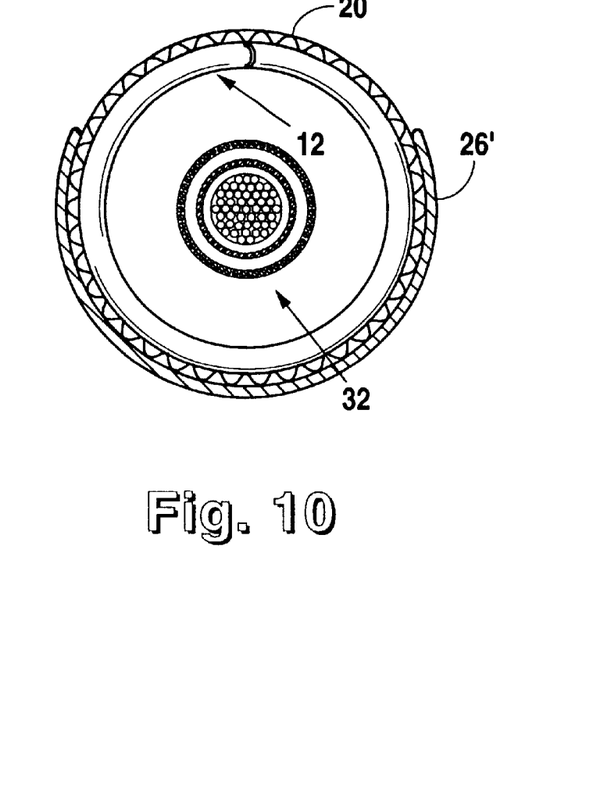
FIGS. 10 and 11 are cross-sectional views of an alternate spring configuration, corresponding essentially to the views of FIGS. 4 and 6.
Figure 11:
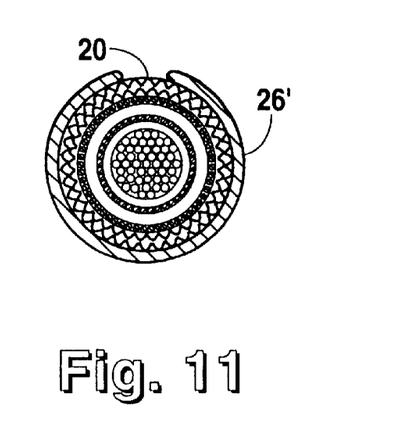

Constant force springs 26 have been described herein as being made from an extended strip of suitable material, such as steel, which is formed into a spiral with overlapping layers or turns which extend about the entire circumference of sleeve 20. However, springs 26 may vary in their configuration. For example, the number of turns of springs 26 can vary within a large range, with springs 26 preferably having between 1 and 2 turns in their expanded state on support core 12. Further, the width of springs 26 can vary in the range of 5–50 mm, and preferably in the range of 10–20 mm. Finally, it is not necessary that springs 26 take the form of a spiral with overlapping turns. As seen in FIG. 10, it is contemplated that spring 26' need not extend around the entire circumference of conductive sleeve 20 when spring 26' is in its installed configuration. FIG. 10 corresponds essentially to FIG. 4, and shows an identically prepared cable 32 with a splice having support core 12, conductive sleeve 20 and spring 26'. A cable jacket replacement is not shown in FIG. 10. Spring 26' is shown in its expanded state in FIG. 10 and can be seen to extend over slightly more than 180° of the circumference of sleeve 20, so that sleeve 20 and spring 26' are securely held on support core 12. FIG. 11 corresponds essentially to FIG. 6 and shows the splice of FIG. 10 in its installed configuration. It can be seen in FIG. 11 that spring 26' has contracted to cover somewhat less than the entire circumference of sleeve 20, but still covers enough of sleeve 20 to establish a secure and reliable electrical connection.

Figure 12:
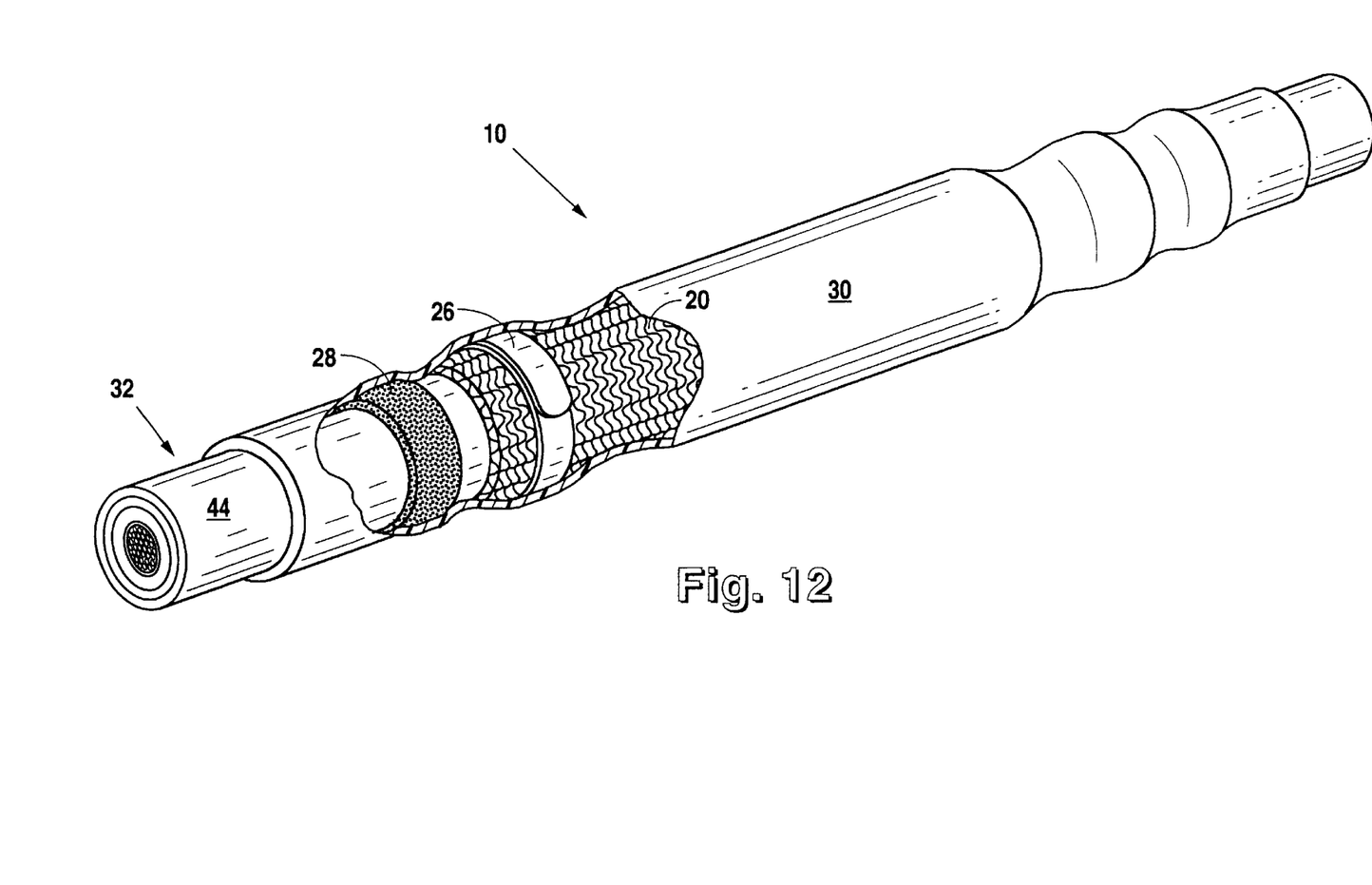
FIG. 12 is a perspective view of an installed splice assembly according to the present invention.

For a better understanding of the invention, the final configuration after the entire removal of the support core 12 is shown in FIG. 12 with some of the parts being broken away for clarity. It shows that the cable jacket replacement 30 at the end covers the entire cable splice so that a more or less continuous jacket is obtained. To provide the necessary sealing against water and humidity, mastic rings 28 are shown (and which in FIG. 12 are thicker than shown in FIGS. 1, 7 and 8 as they have been shrunk down). The mastic 28 shrinks down due to the forces of the cable jacket replacement 30 which simply causes a shrinking of the diameter of the mastic 28 and a corresponding enlargement of its thickness. Furthermore, it can be seen that the copper braid 20 is securely applied onto the folded back cable shield wires 42, both the braid 20 and cable shield wires 42 being held together with the constant force spring 26 which provides the necessary contact forces to withstand short-circuit currents.

It will be recognized by those skilled in the art that multiple other embodiments of a splice assembly may be devised without departing from the scope and spirit of the present invention. It is possible that the components of the splice assembly could be positioned upon a support core in different combinations from those shown in the Figures. For example, it may be desired to position only a conductive sleeve and constant force springs upon a support core. Similarly, it may be desired to position the conductive sleeve, constant force springs and cable jacket replacement on a support core, while the other components (e.g., a multi-layered sleeve having an insulative layer and a conductive shield layer) are placed on a separate support core for installation. As can be seen, the present invention is adaptable to many configurations, with the configurations shown in the Figures being only exemplary.

What is claimed is:

1. An assembly for splicing electrical cables of the type including a central conductor, an insulative layer, a conductive shield, and an outer protective jacket, the assembly comprising:

a longitudinal tubular support core;

a longitudinal conductive sleeve which is a metallic braided sleeve and is positioned coaxially over the support core; and at least one spring positioned over the conductive sleeve and compressing against the conductive sleeve, the spring constricting to a reduced diameter when the support core is removed and thereby compress the conductive sleeve against a conductive shield of a cable.

2. The assembly of claim 1, wherein the metallic braided sleeve is formed from copper.

3. The assembly of claim 1, wherein the spring is a constant force spring.

4. The assembly of claim 3, wherein the spring has an essentially circular cross-section and forms a spiral shape with overlapping turns.

5. The assembly of claim 4, wherein upon removal of the core the spring constricts such that it turns in upon itself.

6. The assembly of claim 4, wherein the spiral shaped spring has between 1 and 2 overlapping turns when on the support core.

7. The assembly of claim 3, wherein the spring extends around less than the entire circumference of the conductive sleeve.

8. The assembly of claim 1, wherein the spring has a width which is smaller than the longitudinal extension of the conductive sleeve.

9. The assembly of claim 1, further comprising a tubular cable jacket replacement layer positioned over the conductive sleeve and spring.

10. The assembly of claim 9, wherein the cable jacket replacement layer is formed from an elastomeric material which shrinks to a smaller diameter upon removal of the support core.

11. The assembly of claim 9, further comprising conformable mastic positioned adjacent an end of the conductive sleeve between the support core and the cable jacket replacement layer.

12. The assembly of claim 1, further comprising a tubular insulative layer positioned between the support core and the conductive sleeve.

13. The assembly of claim 12, further comprising a tubular conductive layer positioned between the insulative layer and the conductive sleeve.

14. The assembly of claim 13, wherein the insulative layer and the conductive layer are formed from elastomeric material which shrinks to a smaller diameter upon removal of the support core.

15. The assembly of claim 14, wherein the insulative layer and the conductive layer are co-extruded.

16. The assembly of claim 1, wherein the support core is radially collapsible.

17. The assembly of claim 16, wherein the support core is spirally wound.

* * * * *